United States Patent [19]

Patterson

[11] Patent Number: 5,895,059
[45] Date of Patent: Apr. 20, 1999

[54] HIGH SPEED LATHE CHUCK

[76] Inventor: Alan C. Patterson, 2424 E. Coon Lake Rd., Howell, Mich. 48843

[21] Appl. No.: 08/920,583

[22] Filed: Aug. 29, 1997

Related U.S. Application Data

[60] Provisional application No. 60/024,931, Aug. 30, 1996.

[51] Int. Cl.$^6$ ........................................................ B23B 5/22
[52] U.S. Cl. ........................ 279/106; 279/106; 279/107; 279/109; 279/127; 279/141
[58] Field of Search ................................. 279/106, 107, 279/109, 127, 141

[56] References Cited

U.S. PATENT DOCUMENTS

| | | | |
|---|---|---|---|
| 1,881,905 | 10/1932 | Page et al. | 279/141 |
| 3,016,245 | 1/1962 | Zelewsky | 279/106 |
| 4,243,237 | 1/1981 | Rohm | 279/121 |
| 5,253,880 | 10/1993 | Won | 279/106 |

Primary Examiner—Andrea L. Pitts
Assistant Examiner—Monica Smith
Attorney, Agent, or Firm—Brooks & Kushman P.C.

[57] ABSTRACT

A lathe chuck assembly is configured for high-speed turning operations. The assembly includes a riser adapter and a yolk plate movably connected with respect to the riser adapter. First, second and third cam arms are connected to the yolk plate for grasping a workpiece for turning operations. Each cam arm includes a cam slot formed therein. A face plate is mounted to the riser adapter. The face plate includes first, second and third cam arm openings formed therein for receiving cam pins for cooperation within the respective cam slots. The face plate includes a locally thickened cross-sectional area surrounding each cam arm opening for added structural integrity and a plurality of locally thinned cross-sectional areas spaced across the face plate for weight reduction. A web structure of substantially uninterrupted cross-sectional thickness is provided for structural integrity at high rotational speeds.

14 Claims, 7 Drawing Sheets

Fig. 1
*(PRIOR ART)*
Fig. 3
*(PRIOR ART)*
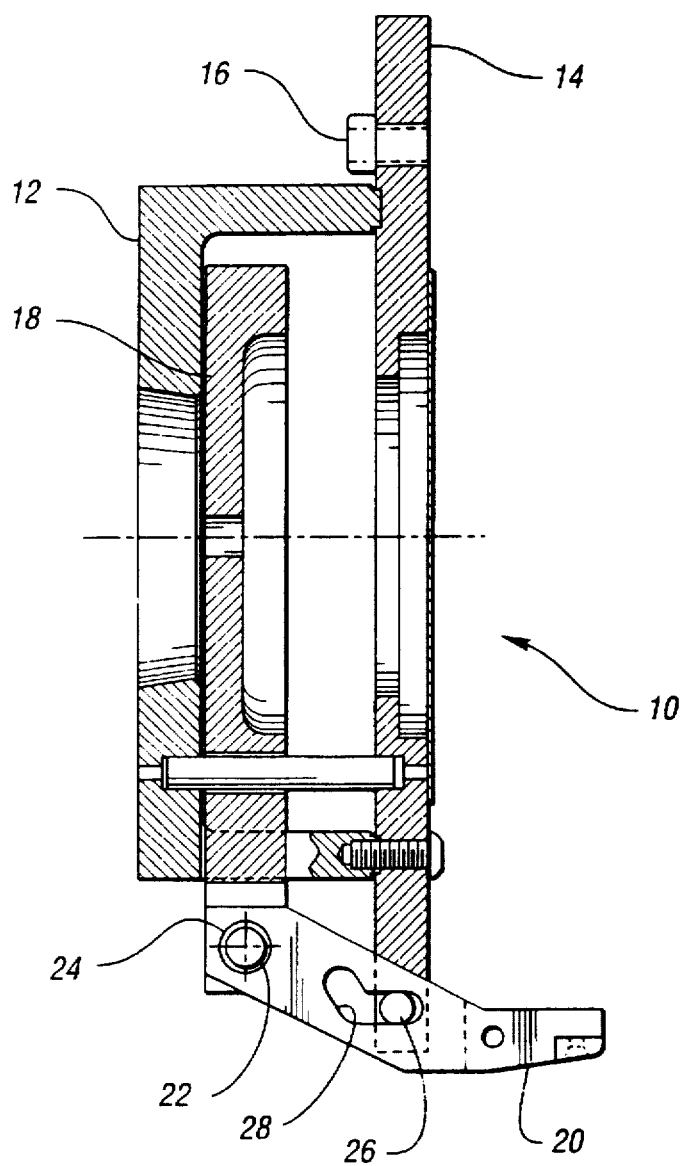
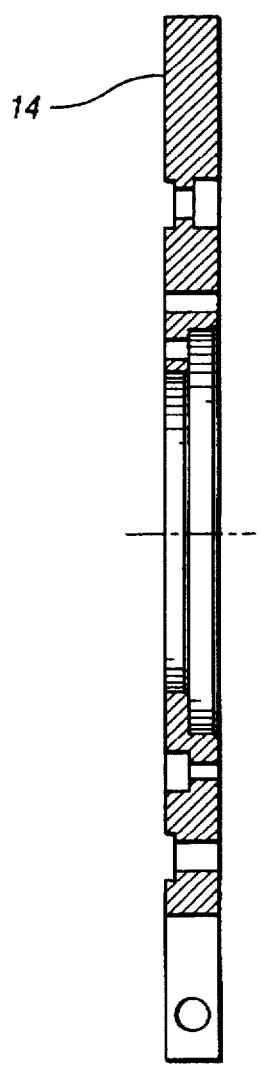

HIGH SPEED LATHE CHUCK

CROSS-REFERENCE TO RELATED APPLICATION

This application is related to earlier filed U.S. provisional application Ser. No. 60/024,931, filed Aug. 30, 1996.

TECHNICAL FIELD

The present invention relates to a lathe chuck, and more particularly to a lathe chuck configured for high-speed machining operations.

BACKGROUND ART

Lathe chucks are typically used for securing aluminum wheels or other substantially round workpieces in a machine for turning operations. A prior art lathe chuck is illustrated in FIGS. 1–3.

The prior art lathe chuck assembly 10 illustrated in FIGS. 1–3 comprises a riser adapter 12, a face plate 14, a locator ring bearing 16, a yolk plate 18, and a cam arm 20. The cam arm 20 is pivotally connected to the yolk plate 18 by a pivot pin 22 and bearing 24. A cam pin 26 is mounted to the face plate 14, and rides in a cam slot 28 formed in the cam arm 20 such that the cam arm 20 is pivoted inward for securing an aluminum wheel to the lathe chuck assembly 10 as the face plate 14 moves away from the yolk plate 18. As shown in FIG. 2, the face plate 14 includes three cam arm slots 30, 32, 34 for mounting three cam arms 20 at equally spaced positions about the periphery of the face plate 14. Referring to FIG. 3, it is illustrated that the face plate 14 comprises a substantially constant cross-section.

This prior art lathe chuck assembly 10 illustrated in FIGS. 1–3 is typically useful up to speeds of approximately 2800 RPMs, and may fail at speeds thereabove.

It is desirable to provide a lathe chuck which may be used at speeds of 4,000 to 5,000 RPM without risk of failure and without substantial added weight.

Disclosure of the Invention

The present invention provides a lathe chuck assembly capable of use at speeds in excess of 4,000 RPMs by providing a lathe chuck assembly which includes a face plate having locally thickened cross-sectional areas surrounding cam arm openings for added structural integrity, and a plurality of locally thinned cross-sectional areas spaced across the face plate for weight reduction. The lathe chuck assembly of the invention further comprises a support web structure including a plurality of radially extending web areas of substantially uninterrupted cross-sectional thickness extending radially from the center of the face plate for added structural integrity.

More specifically, the present invention provides a lathe chuck assembly for high-speed turning operations, including a riser adapter and a yolk plate movably connected with respect to the riser adapter. First, second and third cam arms are connected to the yolk plate for grasping a workpiece for turning operations. Each cam arm includes a cam slot formed therein. A face plate is mounted to the riser adapter. The face plate includes first, second and third cam arm openings formed therein for receiving cam pins for cooperation within the respective cam slots. The face plate further comprises a locally thickened cross-sectional area surrounding each cam arm opening for added structural integrity and a plurality of locally thinned cross-sectional areas spaced across the face plate for weight reduction.

In a preferred embodiment, the face plate also includes a support web structure including a plurality of radially extending web areas of substantially uninterrupted cross-sectional thickness extending radially from the center of the face plate. The plurality of locally thinned cross-sectional area includes a plurality of circumferentially spaced pockets formed in the face plate about the periphery of the face plate and a plurality of circumferentially spaced grooves formed in the face plate. The radially extending web areas include attachment apertures extending therethrough for attachment to the riser adapter, such that maximum structural integrity of the assembly is achieved for high RPMs.

Accordingly, an object of the present invention is to provide a lathe chuck assembly which may be used at speeds near 4,000 RPMs without risk of failure and without substantial added weight.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 shows a side cross-sectional view of a lathe chuck assembly in accordance with the prior art;

FIG. 3 shows a side view of the prior art face plate of FIG. 2;

DETAILED DESCRIPTION OF THE PREFERRED EMBODIMENT

Figure 2:
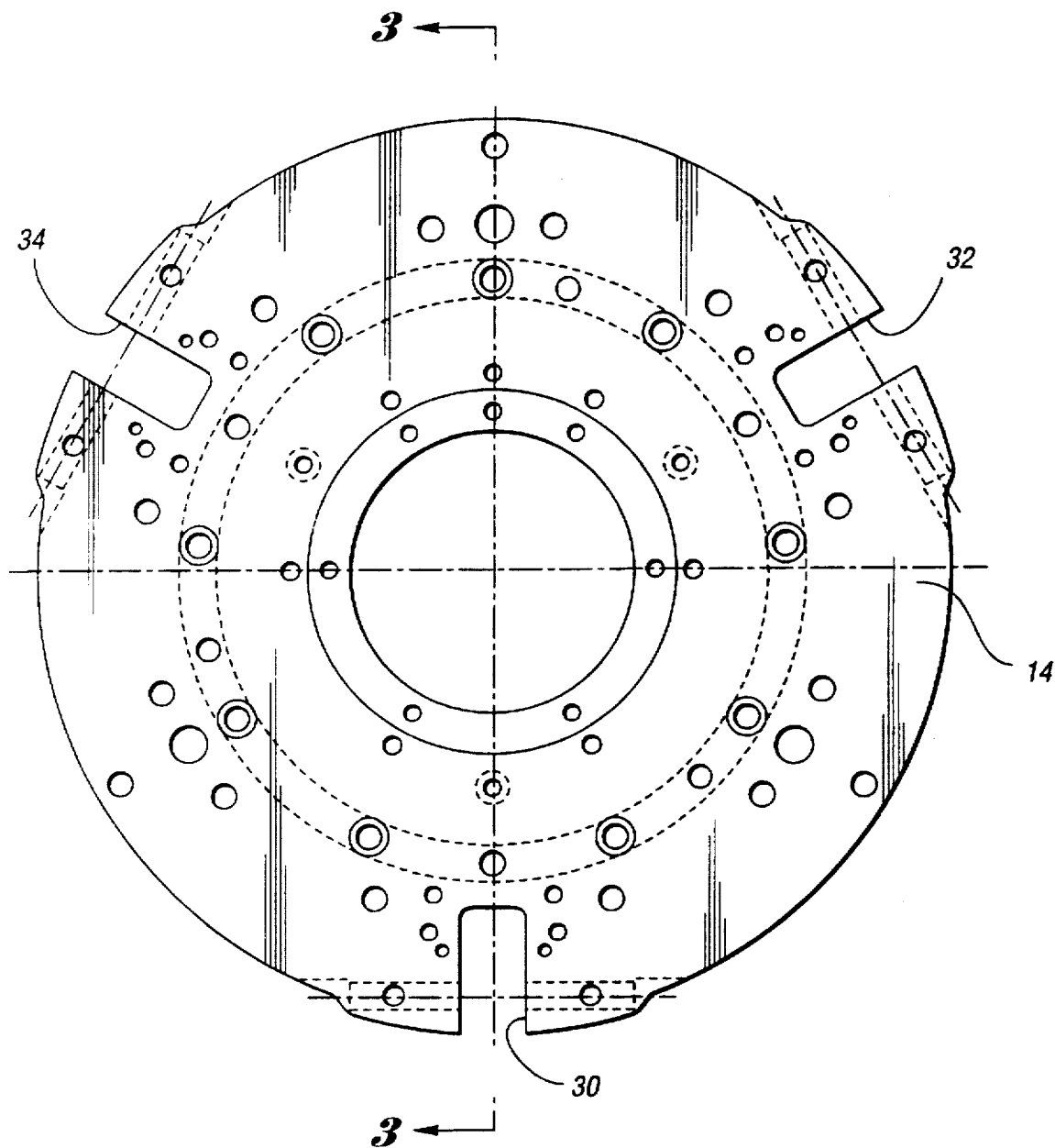
FIG. 2 shows a plan view of a face plate for use with the prior art lathe chuck assembly shown in FIG. 1.
Figure 4:
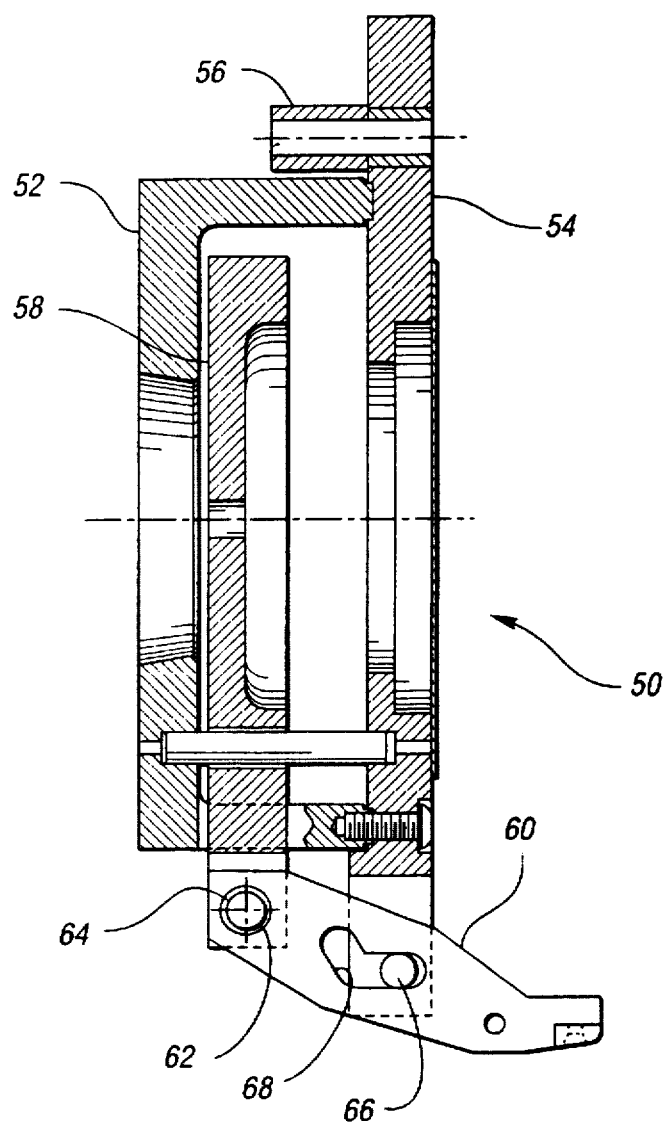
FIG. 4 shows a vertical cross-sectional view of a lathe chuck assembly in accordance with the present invention.

Accordingly, the present invention is illustrated in FIGS. 4–12 for overcoming the above-referenced shortcoming of prior art lathe chuck assemblies.

The lathe chuck assembly 50 of the present invention similarly includes a riser adapter 52, face plate 54, and locator ring bearing 56. Furthermore, the lathe chuck assembly 50 includes a yolk plate 58 having a cam arm 60 pivotally mounted thereto about a pivot pin 62 and bearing 64. Additionally, the face plate 54 comprises a cam pin 66 which rides in a cam slot 68 such that the cam arm 60 is movable for securing an aluminum wheel to the lathe chuck assembly 50.

In order to operate the lathe chuck assembly 50 at speeds in the range of 4,000 to 5,000 RPM, several modifications have been made, as illustrated in FIGS. 4–12. First of all, the locator ring bearing 56 has been lengthened for improved piloting of the guide pin 70, shown in FIG. 5, which supports the locator ring 72 with respect to the face plate 54.

Additionally, the pivot pin 62 has been increased in diameter from 0.7495 inches to 0.7645 inches. Furthermore, the pivot pin 62 now comprises a chrome-plated Quadco XR steel which is similar to a 4150 steel with tungsten added. Also, the cam pivot bearing 64 is now an Ampco 18 solid bronze material for added strength, as opposed to the traditional sintered material.

The cam pin 66 has been increased in diameter from 0.6245 inches to 0.7078 inches. The cam pin 66 comprises a Quadco XR steel.

Figure 7:
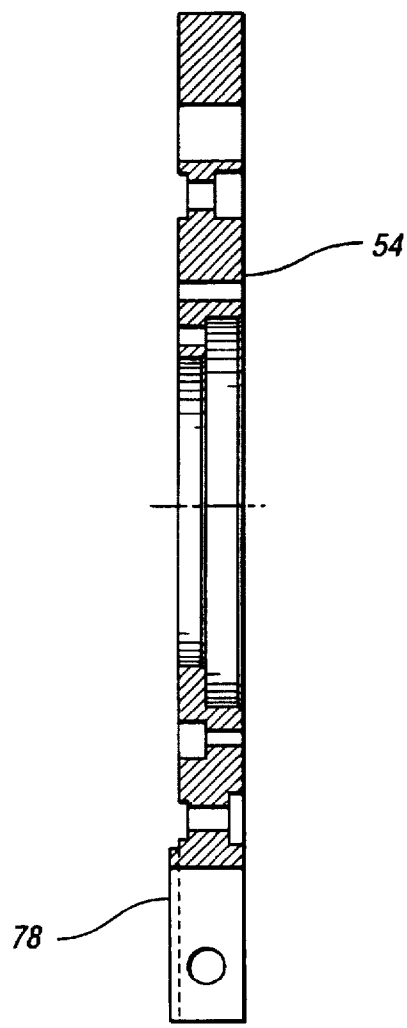
FIG. 7 shows a side view of the face plate of FIG. 6.
Figure 5:
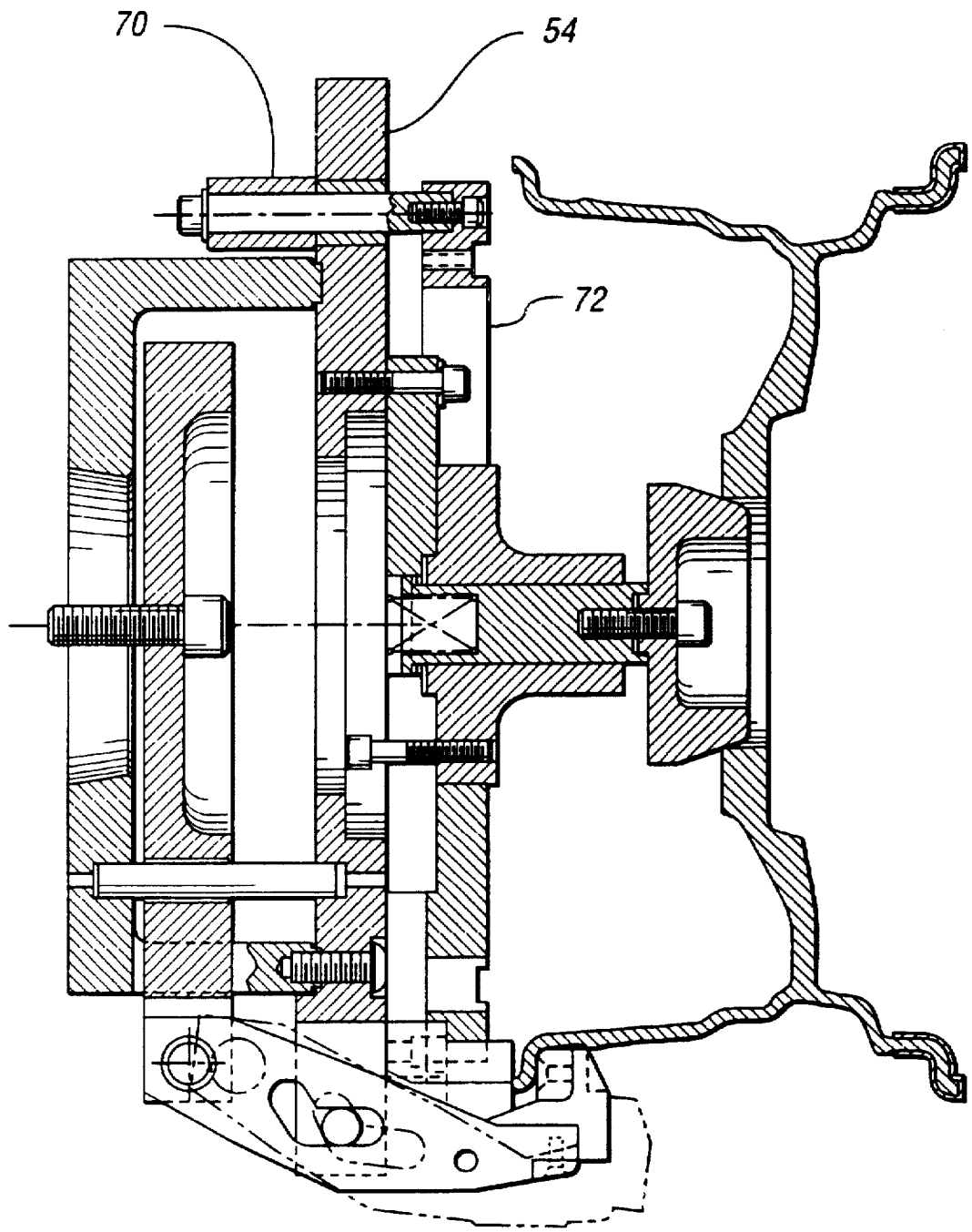
FIG. 5 shows a vertical cross-sectional view of the lathe chuck assembly of FIG. 4 holding a workpiece for turning operations.
Figure 6:
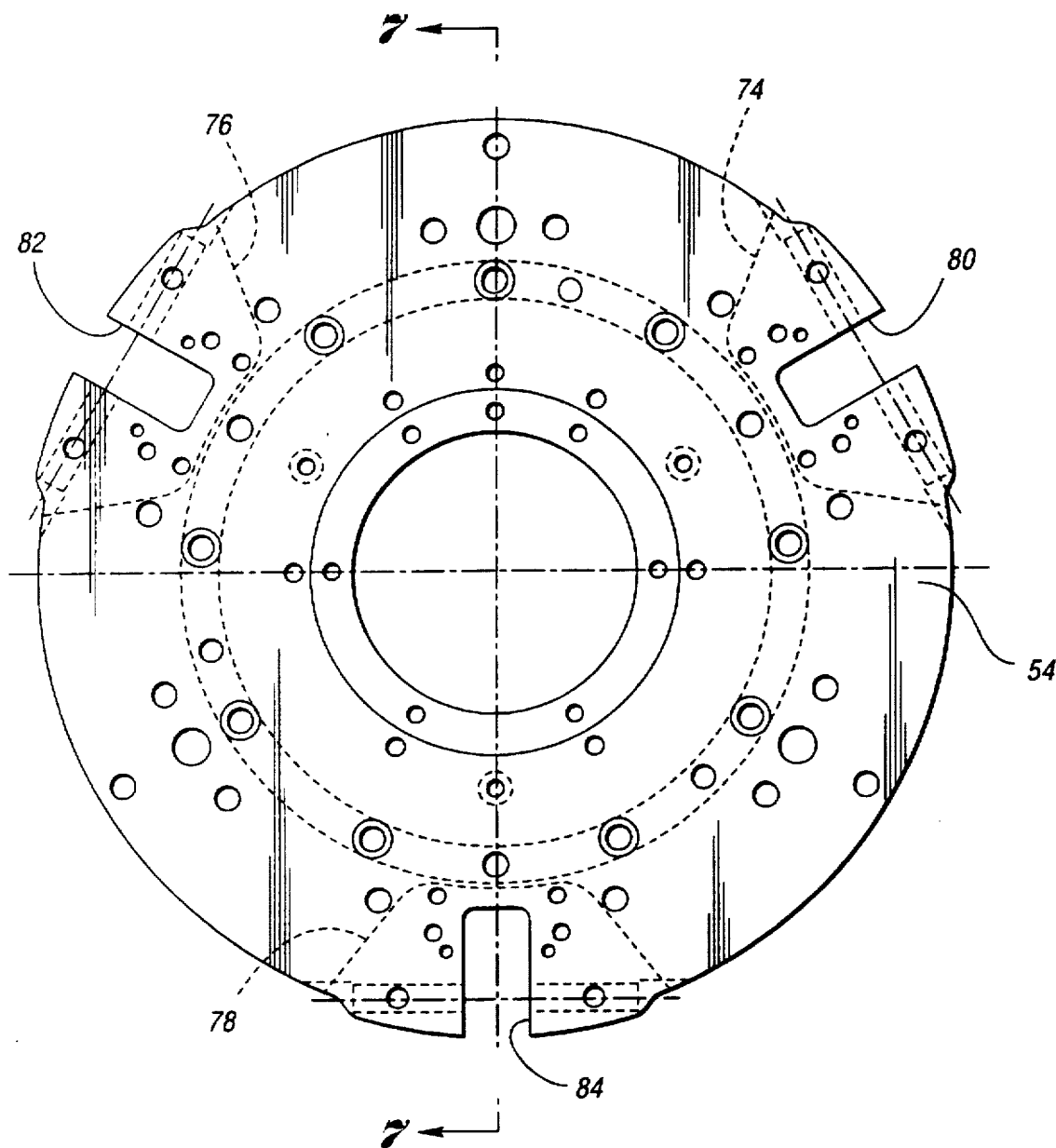
FIG. 6 shows a plan view of a face plate in accordance with the present invention.
Figure 8:
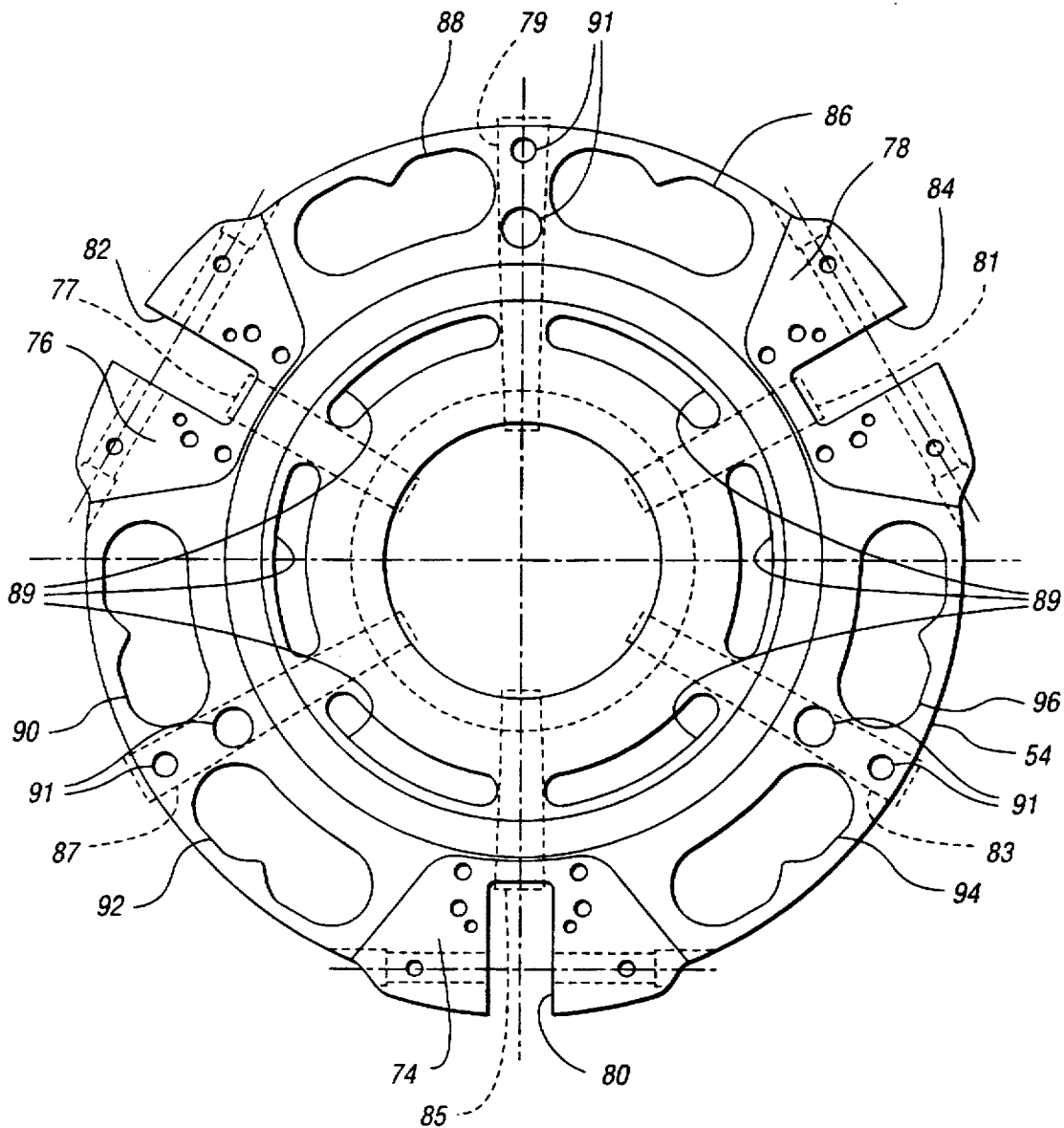
FIG. 8 shows a reverse plan view of the face plate of FIG. 6.
Figure 9:
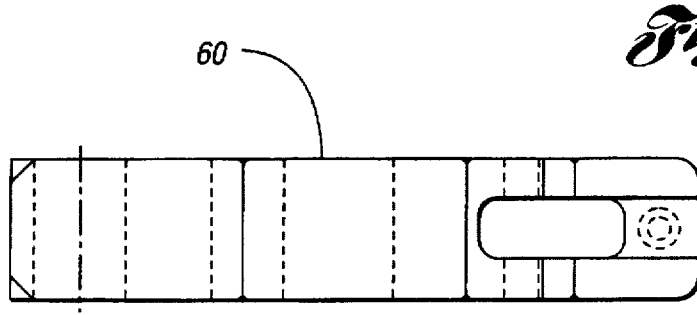
FIG. 9 shows a plan view of a cam arm for use with the present invention.
Figure 10:
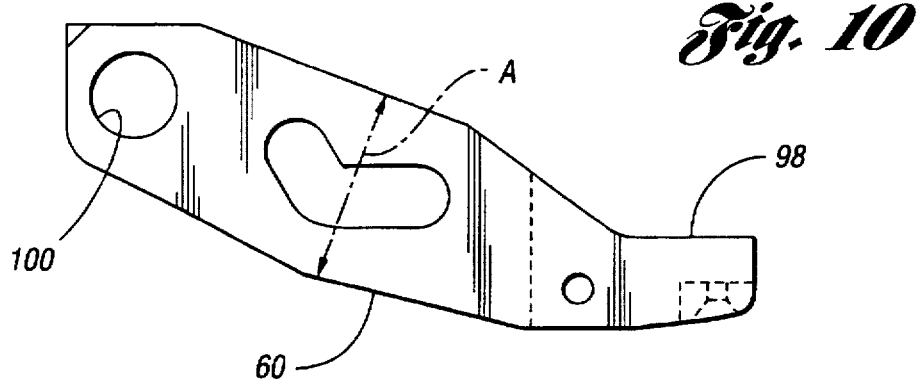
FIG. 10 shows a side view of the cam arm of FIG. 9.
Figure 11:
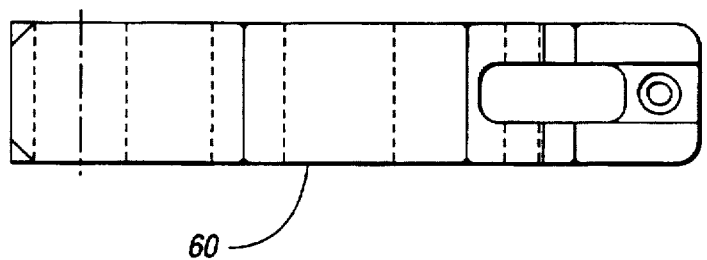
FIG. 11 shows a bottom view of the cam arm of FIG. 9.
Figure 12:
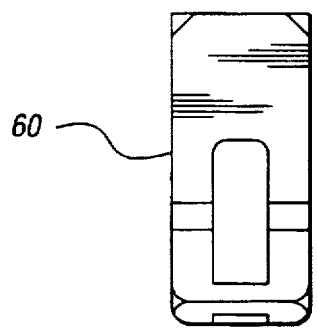
FIG. 12 shows an end view of the cam arm of FIG. 11.

As shown in FIGS. 6, 7 and 8, the face plate 54 comprises three areas 74, 76, 78 of enhanced thickness (1.500 inches) for added strength in the cam arm opening 80, 82, 84 areas. In order to compensate for any added weight in the areas of enlarged thickness 74, 76, 78, a plurality of pockets 86, 88, 90, 92, 94, 96 are formed on the opposing surface of the face plate 54, as shown in FIG. 8. The pockets 86, 88, 90, 92, 94, 96 are formed with a depth of approximately 15/16 inch and are circumferentially spaced with respect to each other such that the face plate includes a web-like structure of substantially uninterrupted cross-section. The support web structure includes a plurality of radially extending web areas 77, 79, 81, 83, 85 and 87 as shown in FIG. 8, of substantially uninterrupted cross-sectional thickness extending radially from the center of the face plate 54. This web structure of radially extending substantially uninterrupted cross-sectional thickness areas 77, 79, 81, 83, 85 and 87 in cooperation with the areas of enhanced thickness 74, 76, 78 add substantial structural integrity to the assembly, and make possible the weight reduction achieved in the above-referenced pockets 86, 88, 90, 92, 94, 96 for high RPM lathe operation. For further weight reduction, the circumferentially spaced grooves 89 are also formed in the face plate 54 without interrupting the web areas 77, 79, 81, 83, 85 and 87. The web areas 79, 83, 87 each include attachment apertures 91 extending therethrough for attachment to the riser adapter 52. Accordingly, the web structure, which includes the web areas 77, 79, 81, 83, 85, 87 is configured to support all loads, particularly the load at the attachment apertures 91 between the face plate 54 and the riser adapter 52, as well as the cam arm openings 80, 82, 84 where the cam arms are attached for securing the workpiece. The structure enables high-speed turning operations without substantial added weight. All of the grooves and pockets are formed on the side of the face plate opposite the workpiece to avoid build-up of chips and debris within the grooves and pockets.

In this configuration, structural integrity is not compromised by the pocket formation. Therefore, the face plate ranges in cross-section from approximately 1.5 inches in the areas of enhanced thickness 74, 76, 78 to approximately 0.5 inches in the pockets 86, 88, 90, 92, 94, 96. In this configuration, substantial strength is added without adding additional weight to the assembly.

Additionally, the cam arm 60 has been redesigned to withstand greater rotational forces, as shown in FIGS. 9–12. The cam arm 60 now comprises an enlarged lateral cross-section taken along the line marked "A," shown in FIG. 10. With this enlarged cross-section, the moment forces exerted at the end 98 of the cam arm 60 with respect to the attachment aperture 100 will be insufficient to cause failure of the cam arm 60 at 4,000–5,000 RPM.

Accordingly, by locally thickening the face plate 54, strengthening the pivot pin 62 and cam pin 66, increasing the lateral cross-sectional area of the cam arm 60, and adding pockets to the face plate, the lathe chuck assembly becomes operable at speeds of 4,000–5,000 RPM without substantial added weight.

While the best mode for carrying out the invention has been described in detail, those familiar with the art to which this invention relates will recognize various alternative designs and embodiments for practicing the invention within the scope of the appended claims.

What is claimed Is:

1. A lathe chuck assembly for high-speed turning operations, comprising:

a riser adapter;

a yolk plate movably connected with respect to the riser adapter;

first, second and third cam arms pivotally connected to the yolk plate for grasping a workpiece for turning operations, each cam arm having a cam slot formed therein;

a one-piece substantially disk-shaped face plate mounted to the riser adapter and having a basic disk thickness in an axial direction of the face plate, said face plate having first, second and third cam arm openings formed therein for receiving cam pins for cooperation within the respective cam slots, wherein said face plate comprises a thickened portion surrounding each cam arm opening for added structural integrity, each said thickened portion having a thickness in the axial direction greater than said basic disk thickness and a plurality of thinned portions of the face plate spaced across the face plate for weight reduction, each said thinned portion having a measurable thickness in the axial direction less than said basic disk thickness; and wherein the face plate further comprises a support web structure including a plurality of radially extending web areas of substantially uninterrupted cross-sectional thickness equal to said basic disk thickness extending radially from the center of the face plate.

2. The lathe chuck assembly of claim 1, wherein said plurality of thinned portions comprises a plurality of circumferentially spaced pockets formed in the face plate about the periphery of the face plate and a plurality of circumferentially spaced grooves formed in an axial end face of the face plate to form said thinned portions.

3. The lathe chuck assembly of claim 2, wherein said radially extending web areas include attachment apertures extending therethrough for attachment to the riser adapter.

4. The lathe chuck assembly of claim 3, further comprising a solid bronze pivot bearing operatively positioned at the pivotal connection between the yolk plate and each cam arm.

5. The lathe chuck assembly of claim 3, wherein said face plate comprises a cross-sectional thickness approximately three times greater in the thickened portions than at the circumferentially spaced pockets.

6. A lathe chuck assembly for high-speed turning operations, comprising:

a riser adapter;

a yolk plate movably connected with respect to the riser adapter;

first, second and third cam arms pivotally connected to the yolk plate, each cam arm having a cam slot formed therein;

a one-piece substantially disk-shaped face plate mounted to the riser adapter and having a basic disk thickness in an axial direction of the face plate, said face plate having first, second and third cam arm openings formed therein with cam pins extending through the cam arm openings for cooperation with the respective cam slots, wherein said face plate comprises a thickened portion surrounding each cam arm opening for added structural integrity, each said thickened portion having a thickness in the axial direction greater than said basic disk thickness, and a plurality of thinned portions spaced across the face plate for weight reduction, each said thinned portion having a measurable thickness in the axial direction less than said basic disk thickness; and wherein the face plate further comprises a support web structure including a plurality of radially extending web areas of substantially uninterrupted cross-sectional thickness equal to said basic disk thickness extending radially from the center of the face plate.

7. The lathe chuck assembly of claim 6, wherein said plurality of thinned portions comprises a plurality of circumferentially spaced pockets formed in the face plate about the periphery of the face plate and a plurality of circumferentially spaced grooves formed in an axial end face of the face plate to form said thinned portions.

8. The lathe chuck assembly of claim 7, wherein said radially extending web areas include attachment apertures extending therethrough for attachment to the riser adapter.

9. The lathe chuck assembly of claim 8, further comprising a solid bronze pivot bearing operatively positioned at the pivotal connection between the yolk plate and each cam arm.

10. The lathe chuck assembly of claim 8, wherein said face plate comprises a cross-sectional thickness approximately three times greater in the thickened portion areas than at the circumferentially spaced pockets.

11. A lathe chuck assembly for high-speed turning operations, comprising:

a riser adapter;

a yolk plate movably connected with respect to the riser adapter;

first, second and third cam arms pivotally connected to the yolk plate, each cam arm having a cam slot formed therein;

a one-piece, substantially disk-shaped face plate mounted to the riser adapter and having a basic disk thickness in an axial direction of the face plate, said face plate having first, second and third cam arm openings formed therein with cam pins extending across the openings for cooperation within the respective cam slots, wherein said face plate comprises a thickened portion surrounding each cam arm opening for added structural integrity, each said thickened portion having a thickness in the axial direction greater than said basic disk thickness, and a plurality of thinned portions spaced across the face plate for weight reduction, each said thinned portion having a measurable thickness in the axial direction less than said basic disk thickness; and wherein the face plate further comprises a support web structure including a plurality of radially extending web areas of substantially uninterrupted cross-sectional thickness equal to said basic disk thickness extending radially from the center of the face plate, and wherein said plurality of thinned portions comprises a plurality of circumferentially spaced pockets formed in the face plate about the periphery of the face plate and a plurality of circumferentially spaced grooves formed in an axial end face of the face plate to form said thinned portions.

12. The lathe chuck assembly of claim 11, wherein said radially extending web areas include attachment apertures extending therethrough for attachment to the riser adapter.

13. The lathe chuck assembly of claim 12, further comprising a solid bronze pivot bearing operatively positioned at the pivotal connection between the yolk plate and each cam arm.

14. The lathe chuck assembly of claim 12, wherein said face plate comprises a cross-sectional thickness approximately three times greater in the thickened portion areas than at the circumferentially spaced pockets.

* * * * *

UNITED STATES PATENT AND TRADEMARK OFFICE
CERTIFICATE OF CORRECTION

PATENT NO. : 5,895,059
DATED : Apr. 20, 1999
INVENTOR(S) : Alan C. Patterson

It is certified that error appears in the above-indentified patent and that said Letters Patent is hereby corrected as shown below:

Column 5, Line 31, Claim 10: delete "portion areas" and insert --portions--.

Column 6, Line 37, Claim 14: delete "portion areas" and insert --portions--.

Signed and Sealed this

Fifth Day of October, 1999

Q. TODD DICKINSON

Attest:

Attesting Officer

Acting Commissioner of Patents and Trademarks